July 12, 1932.  L. A. BITTORF  1,867,346
FRICTION HINGE
Filed Sept. 19, 1927
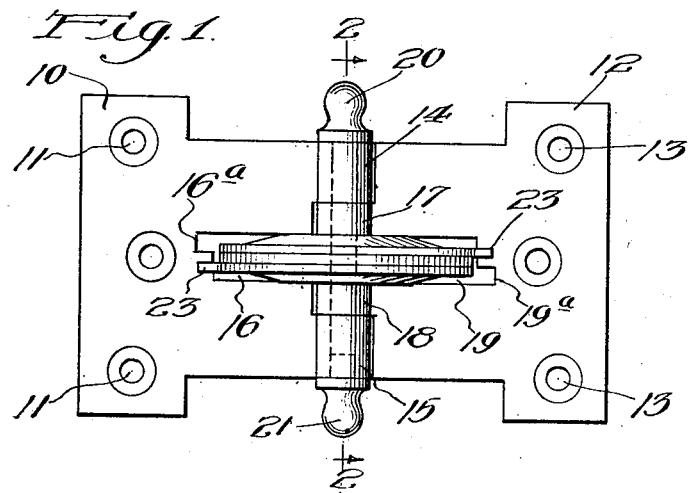
Fig. 1.
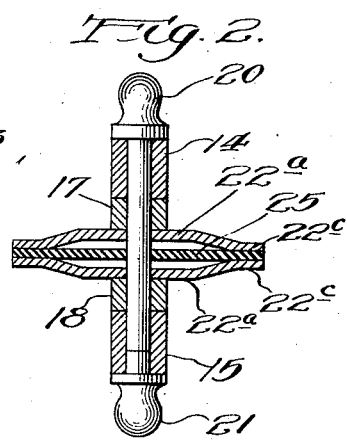
Fig. 2.
Fig. 3.
Fig. 4.
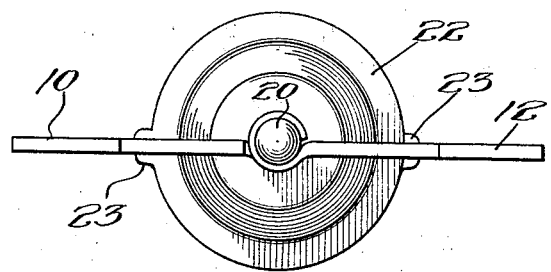
Fig. 5.
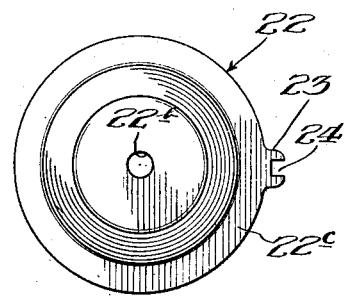
Fig. 6.
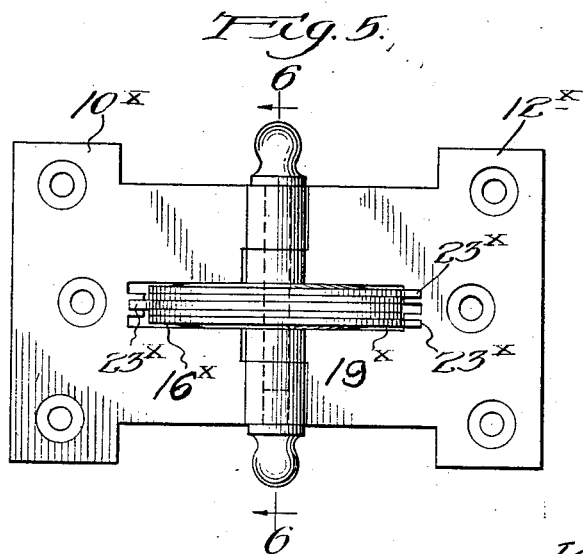
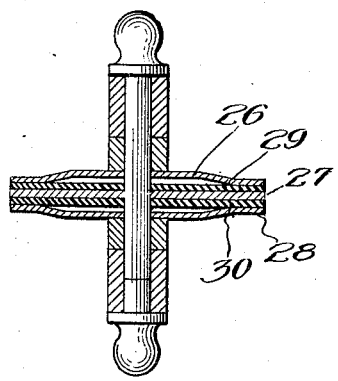
Inventor:
Louis A. Bittorf,
by
Rector, Hibben, Davis & Macauley Atty's Patented July 12, 1932

1,867,346

UNITED STATES PATENT OFFICE

LOUIS A. BITTORF, OF STERLING, ILLINOIS, ASSIGNOR TO NATIONAL MANUFACTURING COMPANY, OF STERLING, ILLINOIS, A CORPORATION OF ILLINOIS

FRICTION HINGE

Application filed September 19, 1927. Serial No. 220,310.

My invention relates generally to hinges and has to do particularly with hinges embodying friction means adapted to hold the hinge members in any position to which they may be moved, and which may be readily used for supporting and moving swinging windows, doors, panels, and the like.

One of the objects of my invention is to provide a novel hinge of this character which is simple in construction, cheap to manufacture and highly efficient in operation at all times.

Another object is to provide a friction means in the form of friction discs cooperating with a friction element in such a manner that the effective friction surfaces are at the outer edges of the discs and at a point considerably remote from the axis of rotation of the hinge thereby giving a greater leverage and enabling the use of a friction surface which is effective to positively hold the hinge members in any hinging position without interfering with the swinging ability of the same. This arrangement also aids in the swinging movement of the hinge members in that a very substantial and uniform supporting surface may be provided throughout the hinging movement.

A further object is to positively grip the friction discs and element together by one of the hinge members in such a way that the discs frictionally engage the friction element in all rotative positions and maintain substantial frictional engagement regardless of wear.

Still another object is to so construct and mount the discs that they may be readily and quickly assembled or disassembled thereby greatly facilitating manufacture and maintenance.

Other and further objects and advantages will become apparent as this description progresses and by reference to the drawing in which,—

Figure 1 is a front elevation of a hinge embodying my invention;

Fig. 2 is a vertical section of the hinge of Fig. 1 taken substantially on line 2—2 of that figure;

Fig. 3 is a top plan view of the hinge of Fig. 1;

Fig. 4 is a plan view of one of the friction discs which I employ in the structure of Fig. 1;

Fig. 5 is a front elevation of a modified form of hinge embodying my invention;

Fig. 6 is a vertical section taken on line 6—6 of Fig. 5.

Referring to the drawing, and particularly to Figs. 1 to 4 inclusive showing the preferred form, the hinge member 10 may be secured to a supporting part (not shown) by suitable fastening devices passing through openings 11, and the hinge member 12 may be secured to a swinging part such as a door, window, panel, or the like (not shown) by fastening devices passing through the openings 13. The inner end of the member 10 is provided along its outer edges with spaced extensions formed to provide integral and spaced hinge pin sleeves 14 and 15. The central part of the member 10, intermediate these sleeves, is provided with a slot 16, having a notch 16$^a$ in its end wall, the purpose of which will become obvious later. The inner end of the other member 12 is provided with spaced and centrally located extensions formed to provide integral hinge pin sleeves 17 and 18 which fit snugly between the sleeves 14 and 15 as shown in Figures 1 and 2. The member 12 is also provided with a centrally located slot 19 opening into the space between the sleeves 17 and 18 in alignment with the slot 16, and also having a notch 19$^a$ in its end wall. The members 10 and 12 are hingedly connected by the hinge pin 20 passing through the sleeves 14, 15, 17 and 18. The usual form of plug 21 is inserted in the sleeve 15 for a well-known purpose.

As hereinabove explained my invention involves the use of friction means cooperating with the hinge members to aid in support and operation of the same as well as to hold such members and the parts carried thereby in any hinging position. To this end I employ a plurality of identical metal friction discs 22 each having a cupped central portion 22$^a$ with an opening 22$^b$ in its central part to receive the hinge pin 20 (Figures 2 and 4). The outer edge of each disc is flat to provide a substantial friction surface 22$^c$ at a point considerably remote from the pin opening 22$^b$. Each disc is provided with an edge projection 23 having a notch 24 which is engaged by the members 10 and 12 as will be described more particularly hereinafter.

In assembling the hinge, I preferably employ two discs 22 and arranged them with their cupped surfaces projecting outwardly and insert a friction element, preferably, in the form of a flat fiber disc 25, between the discs 22 and upon which the friction surfaces 22$^c$ bear. The thickness of the disc assembly at its central part is somewhat greater than the width of the space between the sleeves 17 and 18 but the cupped disc surfaces 22$^a$ are sufficiently yielding to permit such assembly to be forced between those sleeves where they are tightly gripped and positioned. This arrangement not only provides for convenient and rapid assembly and disassembly but holds the discs in the desired yieldable frictional engagement with the fiber disc 25 and substantial frictional engagement is maintained regardless of wear. When the discs are assembled as above set forth one of them (the upper disc in Figure 1) has its notch 24 engaged by the inner wall of the slot 19 for the purpose of rotating that disc as that hinge member is moved. To complete the assembly of the hinge, the hinge members are moved together with the sleeves 14 and 15 passing over and aligning with the sleeves 17 and 18 and the projecting part of the disc assembly extending into the slot 16 and its projection notch 24 is engaged by the inner edge of that slot. The hinge pin is then inserted as shown in Figure 1 and the hinge is ready for operation. The slots 16 and 19 in the assembled hinge form a pocket in which the friction disc assembly is retained. This adds to compactness in construction, and also provides a very rigid construction which is capable of supporting quite heavy loads without undue wear and without the sagging effect which might otherwise result. The disc assembly need not be disturbed or adjusted by the user during or after installation. Upon removal of the hinge pin and separation of the hinge members, the disc assembly remains in place for ready reassembly.

In operation of the hinge, the member 12 swings back and forth and the upper disc rotates therewith upon the fiber element 25 and aids in evenly supporting the object carried by this hinge member in all of its swinging movements. The friction surface is effective to hold the member 12 and the door, window, or the like, (not shown) in any of its hinging positions and such friction surface is so far removed from the hinge pin or the axis of rotation that, due to the leverage, a comparatively large and very effective friction surface may be employed without interfering with the operation of the hinged parts.

In moving the hinge members to their closed position, the inner side edges of the projections 23 extend into the notches 16$^a$ and 19$^a$ at the inner ends of the slots to permit such hinge members to be moved closely together.

In the modified form of my invention shown in Figures 5 and 6, I employ three metal friction discs 26, 27 and 28 and two friction elements such as the fiber discs 29 and 30. The outer discs 26 and 28 are cupped and provided with outer friction surfaces similar to the discs 22, while the inner disc 27 is flat as well as the fiber discs 29 and 30. In this form the outer cupped discs are also provided with projections 23$^x$ having notches similar to the notches 24 in the preferred form which are engaged by the inner edge of the slot 19$^x$ in the member 12$^x$, and the central disc 27 is provided with a similar notched projection engaged by the inner edge of the notch 16$^x$. The manner of mounting and operation of the hinge of Figure 5 is the same as in the hinge of Figure 1, except, that as the hinge member 12$^x$ is moved the two discs 26 and 28 are rotated instead of one disc as in the preferred form.

In describing my invention I have referred to the hinge members 10 as being connected to a stationary part and the other member 12 to a swingable part, but it is to be understood that I do not desire to be limited to the particular manner of mounting the hinge as it is obvious that the hinge may be reversed and either of these members may be attached to a stationary part and the other to a swingable part, or both members may be attached to a swingable part without departing from my invention. Furthermore, while I have shown only two embodiments of my invention, it is to be understood that various changes and modifications may be made therein without departing from the spirit and scope of my invention as defined by the claims which follow.

I claim:

1. A hinge comprising a hinge member, having a pair of spaced hinge pin sleeves, another member having a pair of spaced hinge pin sleeves adapted to fit between and align with said first-named sleeves, and friction means for holding said members in any hinging position including a pair of opposed cupped friction discs providing a yieldable center part and an outer friction surface, a friction element between said discs and engaged only by the friction surfaces of the same, the discs and element being of a thickness greater than the space between said second-named sleeves and being adapted to be yieldingly forced between and retained between said sleeves to provide a self-adjusting frictional engagement between said discs and element, means for interlocking said discs with said hinge members whereby said friction means is rendered effective to hold the hinge members in any of the hinging positions, and a hinge pin freely engaging the sleeves of said members, the discs and friction element.

2. A hinge comprising a hinge member having an attaching portion and spaced hinge pin sleeves, another hinge member having an attaching portion and spaced hinge pin sleeves adapted to be mounted between said first-named sleeves and in alignment with the same, a hinge pin freely passing through said sleeves and interlocking said members, and friction means interlocked with said members, said means comprising a plurality of opposed metal discs having yieldable cupped-shaped central portions and peripheral bearing surfaces, a friction element between said discs and engaged only by said bearing surfaces, said discs and element being yieldably gripped together and held in self-adjusting frictional engagement by and between said second-named sleeves, and notched projections on said discs engaged by said members to effect rotation of the respective disc upon said element as the member which it engages is moved.

3. In a hinge, a hinge member having outer hinge pin sleeves, another member having inner hinge pin sleeves adapted to be mounted between said outer sleeves and connected thereto by a hinge pin, and friction means mounted upon said pin between said inner sleeves and rendered frictionally effective at all times by said central sleeves, said means comprising a pair of opposed metal discs having a central yieldable cupped portion and an outer friction surface, a fiber washer between said discs having contact only with said friction surfaces, and notched projections on said discs engaged by said members for rotating said discs upon said washer as said members are moved about the hinge pin, said discs and washer having a central thickness greater than the space between said inner sleeves, the yieldable cupped portions of said discs permitting the disc assembly to be forced between said central sleeves to hold the discs and washer in frictional engagement.

4. A friction hinge having a pair of hinge members each having means for receiving a hinge pin to hingedly lock the same together and having aligned recesses, and friction means controlled by said members and mounted in the recess of one of said members for holding said members in any of their hinging positions, including a pair of friction discs each having a yieldable center part and an outer friction surface and a friction element therebetween, said discs and element having a total thickness greater than the width of the receiving recess, the yieldable center part of the discs permitting insertion in said recess whereby said friction means is supported in tensioned frictional engagement solely by one of said members.

5. In a hinge, a pair of hinge leaves arranged to be detachably joined together for hinging movements by a separable and readily removable hinge pin, said leaves having aligned central cut-outs providing a central opening in the joined position of said leaves, friction discs mounted in said opening of a combined thickness normally greater than the width of said opening, certain of said discs having cup-shaped compressible portions for insertion of all said discs in said opening under compression, the cup-shape of said discs providing for frictional engagement of said discs adjacent their periphery only and remote from the hinge axis.

6. In a hinge, a pair of leaves joined together for hinging action, said leaves having aligned cut-outs providing an opening in the joined leaves, means for frictionally resisting relative hinging movements of said leaves including a plurality of friction discs some of which have their mid-portions formed to provide a thickness of said friction means greater than the width of said opening, said mid-portions being yieldable to permit the same to be yieldingly forced into the cut-out of one of said leaves, and said last cut-out being engaged for the most part by said yielding disc portion so that when the other of said leaves is detached said discs will be grippingly held in place by said one leaf.

7. In a hinge, a pair of swinging members having aligned sleeves connected by a hinge pin, said members having aligned slots forming a pocket in the assembled position of said members, and friction means in said pocket controlled by said members including a plurality of discs having outer friction surfaces bearing upon a friction element therebetween, said discs being operatively connected to both said members, the total thickness of said means being greater than the width of said pocket and certain of said discs having a yieldable portion so that said discs are grippingly held in tensioned frictional engagement with said element solely by one of said members.

In testimony whereof, I have subscribed my name.

LOUIS A. BITTORF.